United States Patent
Klahn et al.

(10) Patent No.: US 6,421,916 B1
(45) Date of Patent: Jul. 23, 2002

(54) METHOD FOR THE REMOVAL OF RIB PLUGS USING A SPIRAL TIG WELDING TECHNIQUE TO RELAX THE RIB PLUG

(75) Inventors: Kurt David Klahn; Mark Alan Klahn, both of Forest, VA (US)

(73) Assignee: Framatome Anp, Inc., Lynchburg, VA (US)

( * ) Notice: Subject to any disclaimer, the term of this patent is extended or adjusted under 35 U.S.C. 154(b) by 0 days.

(21) Appl. No.: 09/724,035

(22) Filed: Nov. 28, 2000

(51) Int. Cl.[7] ................................................ B23P 15/26
(52) U.S. Cl. .............................. 29/890.031; 29/890.03; 29/727; 29/426.4; 228/119
(58) Field of Search ............................ 29/890.03, 727, 29/426.4, 402.03, 890.031; 138/89; 228/119

(56) References Cited

U.S. PATENT DOCUMENTS

| | | | |
|---|---|---|---|
| 4,831,703 A | * 5/1989 | Wilhelm | 29/890.031 |
| 4,831,720 A | * 5/1989 | Sherer et al. | 29/726 |
| 5,117,548 A | * 6/1992 | Griffith et al. | 29/426.4 |
| 5,167,064 A | * 12/1992 | Sutor, IV | 29/727 |
| 5,189,789 A | * 3/1993 | Hall | 29/890.031 |
| 5,255,717 A | * 10/1993 | Nelson et al. | 138/89 |
| 5,715,598 A | * 2/1998 | Everett et al. | 29/890.031 |

* cited by examiner

Primary Examiner—Irene Cuda-Rosenbaum
(74) Attorney, Agent, or Firm—Vytas R. Matas

(57) ABSTRACT

A method of removing rib plugs from steam generator tubes in energy producing units such as nuclear reactors includes the removal of the expander element or mandrel from the expanded part of the rib plug, TIG welding a bead on the available internal surface of the plug in a spiral manner from the bottom to the top thereof to relax the rib plug from its forced contact with the tube and removal of the rib plug as a unit from the tube after it has cooled down from the welding process.

6 Claims, 3 Drawing Sheets

METHOD FOR THE REMOVAL OF RIB PLUGS USING A SPIRAL TIG WELDING TECHNIQUE TO RELAX THE RIB PLUG

BACKGROUND OF THE INVENTION

1. Field of the Invention

The present invention is generally drawn to reactor tube rib plug removal systems and more particularly to such systems using TIG (Tungsten Inert Gas) welding techniques to relax the rib plug.

2. Description of the Prior Art

In tube-type heat exchangers, a first fluid flows through the tubes of the heat exchanger while a second fluid surrounds the outside of the tubes such that heat exchange occurs between the two fluids. One or more of the tubes can become defective over the life of the heat exchanger such that a leak occurs which allows the two fluids to mingle. When this occurs, it is necessary to plug the tube so that the fluid does not flow through the tube thereby preventing the leakage of the first fluid to the other fluid.

In nuclear reactor power plants, when such a defect occurs in the tubes of a nuclear steam generator the coolant in the tubes is allowed to mingle with the coolant outside of the tubes and a more significant problem arises. A radioactive contamination problem occurs. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube is plugged so that the coolant is not permitted to flow through the tube.

One type of tube plug used for the above application is described in U.S. Pat. No. 4,390,042, which patent is incorporated herein by reference thereto. This plug as best seen in FIG. 1 comprises a shell having a tapered inner surface against which an externally tapered expander member moves by application of a pulling force. The motion of the expander member relative to the shell causes the shell to expand into contact with a heat exchange tube thereby plugging the tube. The expander member is formed from a hardened metal with tangentially blended leading radius and a self-locking trailing edge, which provides for ease in expanding the shell while preventing inadvertent unlocking of the plug. The shell has a substantially uniform wall thickness throughout the portion of the shell which experiences expansion so that the force necessary to perform the expanding process does not increase beyond strength limitations of installation equipment as the expander member is moved through the shell. The shell also has a plurality of lands on the outside surface thereof whose depth increases from closed end to open end of the shell so that a substantially uniform wall thickness can be maintained in that region while allowing the lands to contact the inner surface of the heat exchange tube.

The described plug and its position sealing a faulty reactor stem generator tube are best seen in FIG. 2.

However, under certain circumstances these tube plugs may themselves leak either from a faulty installation or from wear over time and must be removed and replaced. Such removal must be done without damaging the reactor tube so a new plug may be easily installed.

Plug removal systems and methods for using same are well known. The systems utilize impact hammers and pullers and in some cases also use heaters.

The usual known methods involve the removal of the expander member that expands the rib plug to seal the pipe and the subsequent removal of the rib plug from the tube. These methods sometimes drill out the mandrel or expander and involve stretching and pulling the rib plug out of the pipe. Drilling is a very time consuming process and leaves behind numerous metal fragments that must be removed from the reactor tubes. Stretching and pulling the rib plug from the tube may be done by anchoring a member into the open end of the plug and using a push rod that continuously applies a force to the closed end of the plug to stretch it while removing the plug from the tube or by simply locking into the open end of the plug and removing it from of the tube. These removal methods are only occasionally successful and do significant damage to the inner diameter of the steam generator tube.

Other known methods push the mandrel into the rib plug bottom and then push the rib plug into the tube. These methods are well illustrated in the following patents:

U.S. Pat. No. 5,465,483 that teaches to hydraulically push the mandrel back into the end of the rib plug and then to use repetitive impulses to remove the rib plug from contacting the tube;

U.S. Pat. No. 5,517,740 which teaches to use repetitive impulses to displace the mandrel and use the same repetitive impulses to remove the plug from contacting the tube; and U.S. Pat. No. 5,664,328 that teaches to hydraulically push the mandrel back and use repetitive impulses to remove the plug from contacting the tube. These methods while being cleaner than methods drilling out of the mandrel still damage the tube when the rib plug is pushed or pulled there from.

Other known methods add a heating step to condition the rib plug after disengaging the mandrel or expander and before removing the rib plug from the tube. These methods are well illustrated in the following patents:

U.S. Pat. No. 5,255,717 which teaches to hydraulically disengage the mandrel, use longitudinal welder or TIG passes along the inside surface of the rib plug, and then to remove the plug from the tube; and U.S. Pat. No. 4,829,660 that teaches to hydraulically disengaging the mandrel, use longitudinal TIG passes along the inside surface of the rib plug, and to remove the plug from the tube.

These methods using longitudinal passes of the TIG welder has been only marginally successful in completely relaxing the rib plug so it may be pulled from the tube without some damage to the tube. Also, the removal of the rib plugs did not consistently provide an intact removal of the rib plug. In some cases the rib plug would break apart during removal causing parts to fall into the tube that required later pick up resulting in increased cost in time and money. Therefore a new method of rib plug removal was needed which would completely relax the rib plug from being presses into contact with the tube to allow a consistent removal of the entire rib plug intact and without scoring or otherwise damaging the tube.

SUMMARY OF THE INVENTION

The present invention is drawn to a method for removing Westinghouse type rib plugs from steam generator tubes. The method is a three-step process involving:

1) The removal of the expander element or mandrel from the expanded part of the rib plug. This may be done by either pushing the mandrel back into the end of the rib plug or by drilling it out or by impacting the mandrel with a slug driven by air;

2) The TIG welding of the internal surface of the plug in a spiral manner from the bottom to the top thereof to relax the rib plug from its forced contact with the tube; and 3) To lock on the relaxed tube plug open end and pull it out or to stretch and expand the plug as it is being pulled out.

In view of the foregoing it is seen that one aspect of the present invention is to provide a positive method of relaxing the rib plug from contact with the tube after the removal of the mandrel.

Another aspect of the present invention is to provide a method for removing rib plugs from tubes that will not score or deform the tube during the removal of the rib plug.

Yet another aspect of the present invention is to provide a method for consistently removing entire rib plugs from tubes without any breaking of the rib plug with a part falling into the tube.

These and other aspects will be more fully understood upon a review of the following description of the preferred embodiment when considered with the accompanying drawings.

DESCRIPTION OF THE PREFERRED EMBODIMENT

Figure 1:
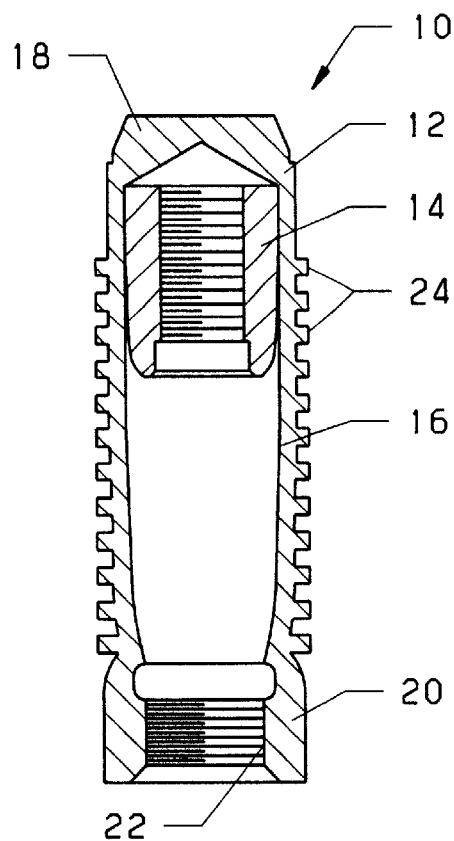
FIG. 1 is a cross sectional view of a prior art ribbed tube plug.

Referring now to the drawings generally and to FIG. 1 in particular, the prior art tube plug (10) comprises a shell (12) and an expander member (14) The shell (12) is a substantially cylindrical member manufactured from a metal such as Inconel. Shell (12) has a conical inner surface (16) that has a larger diameter at the closed end (18) and a smaller diameter at the open end (20). The inner surface (16) is arranged such that expander member (14) is captured within the shell (12) so that movement of the expander member (14) relative to inner surface (16) causes shell (12) to expand without allowing the expander member (14) to be removed from the shell (12). The shell (12) also has a threaded bore (22) near open end (20) which has a diameter larger than the smallest diameter of inner surface (16) which allows the apparatus to be inserted through the threaded bore (22) and into the interior of shell (12) which also has a substantially uniform wall thickness in the portion of shell (12) that is expanded by expander member (14). In addition, a plurality of lands (24) are formed on the outside surface of the shell (12) in a manner such that the height of each land (24) increases from the closed end (18) to the open end (20) while the outer surfaces of all the lands (24) is maintained at approximately the same external diameter and while the wall thickness of shell (12) remains substantially constant throughout the portion of shell (12) wherein the lands (24) are located.

Figure 2:
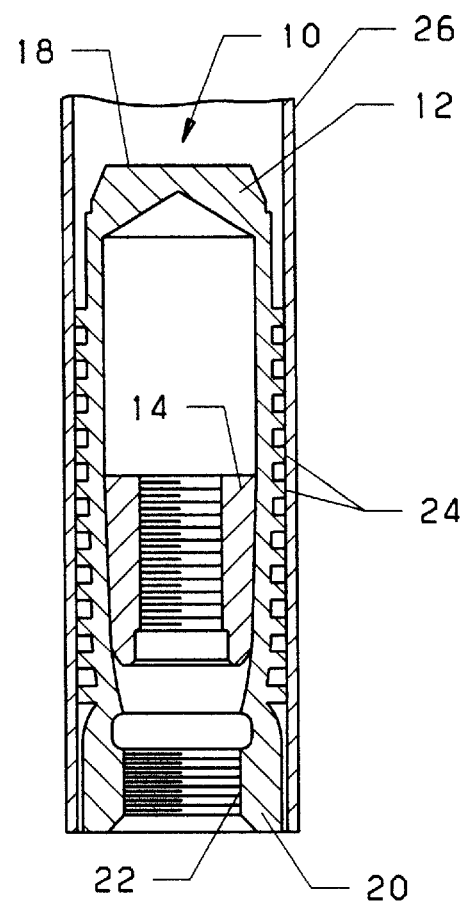
FIG. 2 is a cross-sectional view in elevation of the tube plug in a heat exchanger tube in the expanded position.

As shown in FIG. 2, the relative movement of expander member (14) with respect to inner surface (16) causes the shell (12) to expand until the lands (24) contact the heat exchange tube (26). As the expander member (14) is moved relative to the shell (12) the metal in the wall of shell (12) tends to flow around the expander member (14) such that inadvertent backward motion of the expander member (14) is lessened. This provides a self-locking feature. Once tube plug (10) has been expanded, the tube plug (10) is in the locked position as shown in FIG. 2.

When in this locked position, a plurality of lands (24) are impressed in the wall of heat exchange tube (26). The lands (24) thereby establish a type of labyrinth seal along the inner surface of the heat exchange tube (26) that prevents fluid from flowing therethrough. Moreover, since the shell (12) has a closed end (18) there is no potential leak path through the tube plug (10).

Over time, wear and normal tear may cause some of these rib plugs (10) to develop leaks. These faulty plugs must be removed intact without damaging the walls of the tube (26) so new plugs may be fitted to seal the tube (26). This removal is done utilizing the removal method of the present invention. This method entails the removal of the expander member or mandrel (14) from its locking position with the plug (10) pushing the lands (24) against the tube (26) inner surface, the TIG welding of a spiral weld bead along the entire inner surface of the tube (26) to relax the plug (10) after it cools off, and then the removal of the plug (10) as a unit from the tube (26) without damaging the tube The expander member (14) may be removed by using a tool that locks on to the open end (22) of the plug (10) and pushes it into the end of the shell (12). Alternatively, a slug may be propelled by compressed air to impact on the expander member (14) to drive it to the end of the shell (12). The expander (14) may also be removed by machining it out by drilling, EDM or other known processes.

Figure 3:
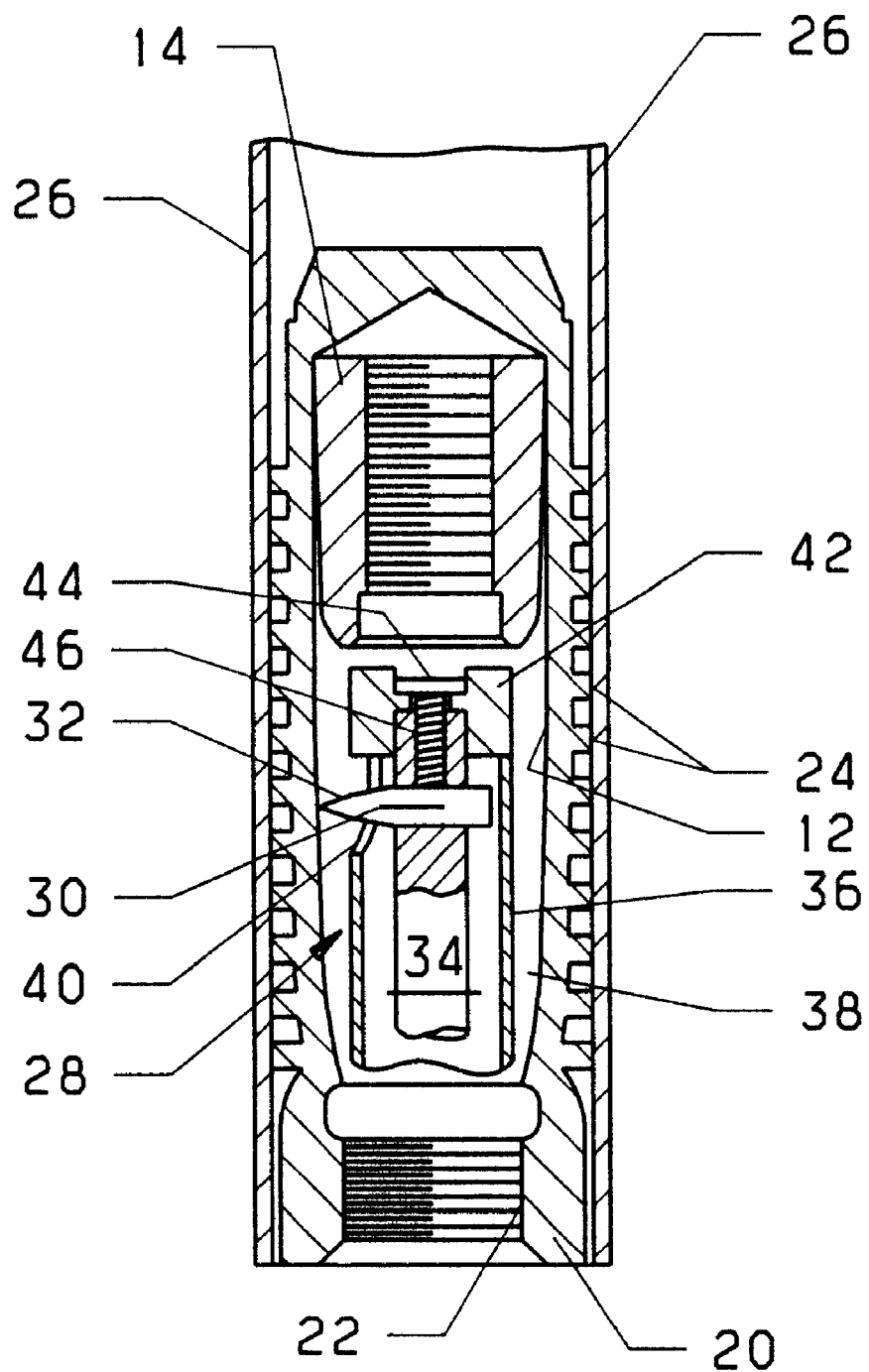
FIG. 3 is a cross-sectional view of the rib plug with the mandrel removed and a TIG welder head positioned therein for spiral welding a spiral bead on the inner surface as per the present invention.

Once the expander member (14) is removed by machining or pushing it to the end of the plug (10), the plug shell (12) is heated by a TIG welding torch (28) as best seen in FIG. 3. The TIG welding torch (28) is preferably a tungsten-inert gas electric-arc torch that includes a tungsten electrode (30) having a tapered end (32) mounted within a hollow rod-shaped copper conductor (34). The electrode (30 and conductor (34) are concentrically arranged within a cylindrical insulating sleeve (36) as shown. An annular space (38) found between the exterior of the copper conductor (34) and the interior of the insulating sleeve (36) forms an inert gas passageway. The tapered end (32) of the tungsten electrode (30) extends out through the insulating sleeve (36) from a semi-circular opening (40). The top end of the rod-shaped copper conductor (34) is secured within the insulating sleeve (36) by means of an insulating cap (42) whose bottom edge is connected to the top edge of the sleeve (36), and whose top end includes a mounting screw (44) that is engaged within a threaded bore (46) in the top of the conductor (42). A set screw (not shown) is also engaged within the threaded bore (46) in order to secure the tungsten electrode (34) within the lateral bore placed within the conductor (34) for this purpose. The foregoing configuration allows inert gas to be directed completely around and across the tungsten electrode (34) during the welding operation while the insulating sleeve (36) prevents arcing between the copper conductor (34), and the inner walls of the plug (10)

Figure 4:
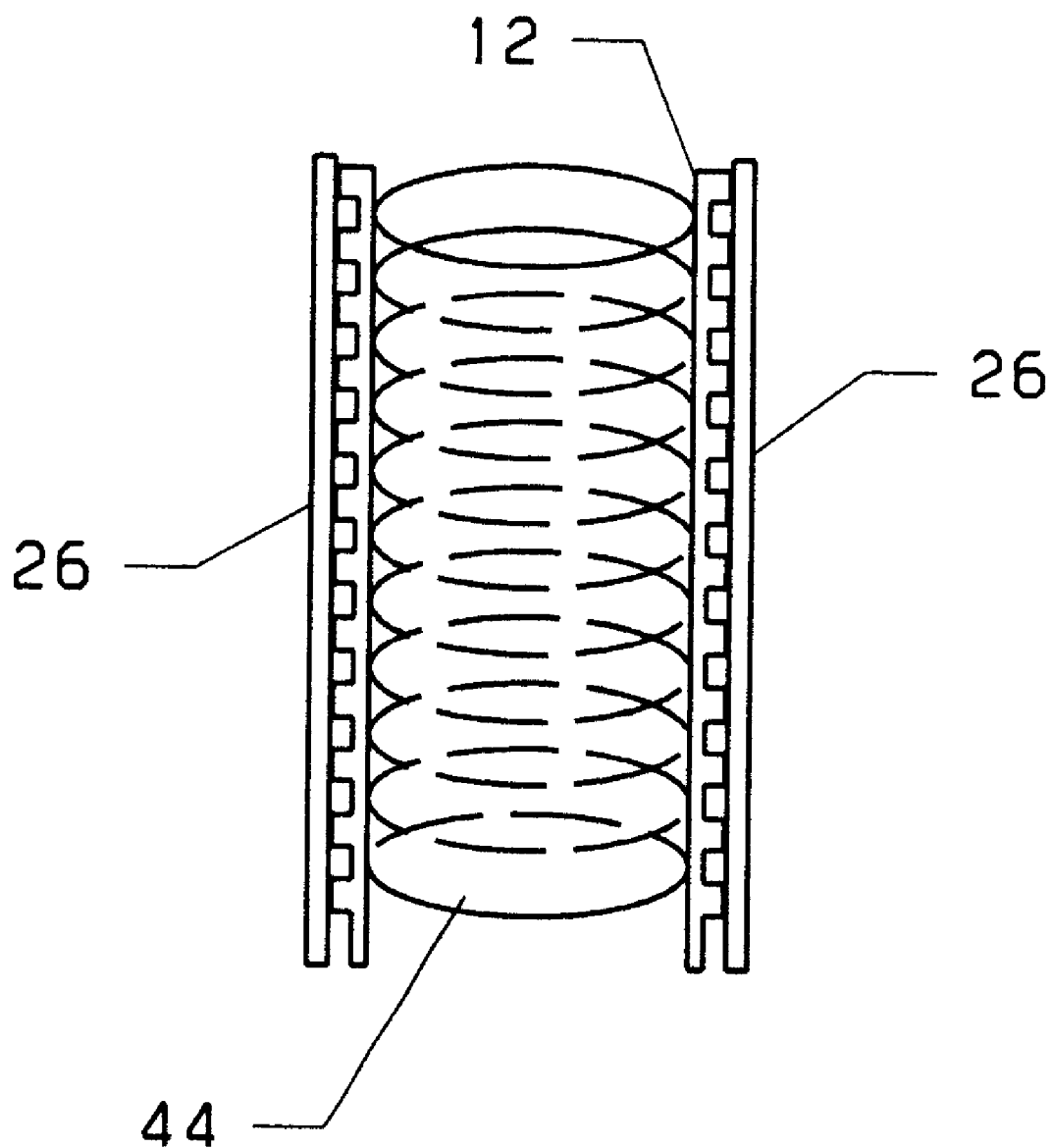
FIG. 4 is a schematic of the spiral bead pattern weld laid down by the TIG of FIG. 3.

In operation the torch (28) produces a spiral weld bead (44) along the shell (12) surface previously holding the expander member (14). The heating and subsequent cooling of this surface relaxes the plug (10) from its pressed contact with the tube (26) allowing it to be removed intact from the tube (26) without any damage to the tube. The torch (28) is set at 4 different power levels during the traversing operation. Level 1 is 20–40 amps and is used as a ramp up to power. Level 2 is 60–90 amps and is applied to the first half of the plug. Level 3 is also 60–90 amps and is applied to the second half of the plug. Level 4 is 20–60 amps and is used to provide a gradual decline of power level. The torch traverses the available surface of the shell (12) at a speed of 1.5 inches per minute and 6 revolutions per minute to produce the spiral pattern seen in FIG. 4. The available space is larger when the expansion member is drilled out rather than pushed into the end of the plug, but the torch settings were found to be the same for proper operation in both cases.

Once the plug (10) has cooled off from the TIG welding operation for 30 seconds, the rib plug (10) relaxes from its sealing position with respect to the tube (26) and is ready to be removed from the tube (26). This may be done by one of two methods. One is to anchor a fixture into the open end (22) of the plug and use a push rod that continuously applies a force to the closed end of the plug while removing the plug from the tube. The other is to simply lock a fixture into the open end of the plug and remove it from of the tube.

There are two main advantages of this system of the present invention over other available processes. This system does the least amount of damage to the tube wall. Another advantage is that the plug (10) is consistently removed as a complete assembly. This helps to reduce concerns of debris from the process falling into the tube (26).

Certain additions and modifications to the present disclosure have been deleted herein for the sake of conciseness and readability but are considered to fall within the scope of the following claims.

What is claimed is:

1. A method of removing a rib plug having an expander member located in the internal surface of the rib plug to seal the rib plug to the tube from the tube so as to have the rib plug come out of the tube as a unit without breakage and without any damage to the tube comprising the steps of:

removing the expander member from its sealing position within the rib plug;

welding a spiral bead along the internal surface of the rib plug to heat the rib plug;

cooling the rib plug to allow the relaxing of the rib plug pressure to the tube surface; and removing the rib plug from the tube as a unit.

2. A method as set forth in claim 1 wherein said step of welding a spiral bead is done using a TIG welding torch located within the rib plug.

3. A method as set forth in claim 2 wherein said plug is a ribbed plug having an internally threaded extender member therein for pressing the ribs of said ribbed member against said tube to seal said tube thereby and wherein said step of removing the expander member includes the pushing of the expander member into the end of the rib plug.

4. A method as set forth in claim 2 wherein said plug is a ribbed plug having an internally threaded extender member therein for pressing the ribs of said ribbed member against said tube to seal said tube thereby and wherein said step of removing the expander member includes the drilling of the expander member.

5. A method as set forth in claim 2 wherein said step of removing the rib plug comprises anchoring a fixture into the open end of the rib plug and using a push rod to continuously apply a force to the closed end of the rib plug while removing the plug from the tube.

6. A method as set forth in claim 2 wherein said step of removing the rib plug comprises locking a fixture into the open end of the rib plug and removing the rib plug from the tube.

* * * * *